United States Patent
Park

(10) Patent No.: US 11,441,343 B2
(45) Date of Patent: Sep. 13, 2022

(54) RUN-UP TYPE SWING-OUT DOOR RETAINER STRUCTURE

(71) Applicants: Hyundai Motor Company, Seoul (KR); Kia Motors Corporation, Seoul (KR)

(72) Inventor: Seung-Young Park, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 280 days.

(21) Appl. No.: 16/690,914

(22) Filed: Nov. 21, 2019

(65) Prior Publication Data

US 2020/0240185 A1    Jul. 30, 2020

(30) Foreign Application Priority Data

Jan. 24, 2019    (KR) .................. 10-2019-0009316

(51) Int. Cl.
E05C 19/00    (2006.01)
B60J 5/04    (2006.01)

(52) U.S. Cl.
CPC .......... *E05C 19/007* (2013.01); *B60J 5/0486* (2013.01)

(58) Field of Classification Search
CPC ........ B60J 5/0486; B60J 5/047; B60J 5/0488; B60J 10/00; B60J 10/30; B60J 10/50; B60J 10/80; B60J 10/86; B60J 10/84; B60J 10/85; B60J 10/87; E05C 19/007; E05C 19/008; E05C 19/00
See application file for complete search history.

(56) References Cited

U.S. PATENT DOCUMENTS

| | | | | |
|---|---|---|---|---|
| 4,861,099 A * | 8/1989 | Sasamura | ............... | E05F 7/005 296/202 |
| 5,433,031 A * | 7/1995 | Dailey | .................... | B60J 10/40 49/27 |
| 5,626,384 A * | 5/1997 | Walther | ..................... | B60J 5/06 296/146.1 |
| 5,787,639 A * | 8/1998 | Lamore, Jr. | ......... | E05B 17/0012 49/380 |
| 5,791,723 A * | 8/1998 | Bell | .......................... | B60J 5/06 16/86 B |
| 5,937,585 A * | 8/1999 | Tidbury | .................... | E05F 7/04 49/504 |

FOREIGN PATENT DOCUMENTS

| | | |
|---|---|---|
| KR | 2019970034891 U | 7/1997 |
| KR | 1020030050625 A | 6/2003 |
| KR | 1020060073063 A | 6/2006 |
| KR | 1020100024018 A | 3/2010 |

\* cited by examiner

*Primary Examiner* — Mark A Williams

(74) *Attorney, Agent, or Firm* — Fox Rothschild LLP

(57) ABSTRACT

A run-up type swing-out door retainer structure includes in a door retainer for a vehicle, a body retainer mounted at a body of the vehicle; and a door retainer mounted at a door of the vehicle to abut the body retainer. A depression formed at the end portion of the body retainer and a protrusion formed at the end portion of the door retainer are divided into an inclined section and a round section to abut each other.

17 Claims, 6 Drawing Sheets

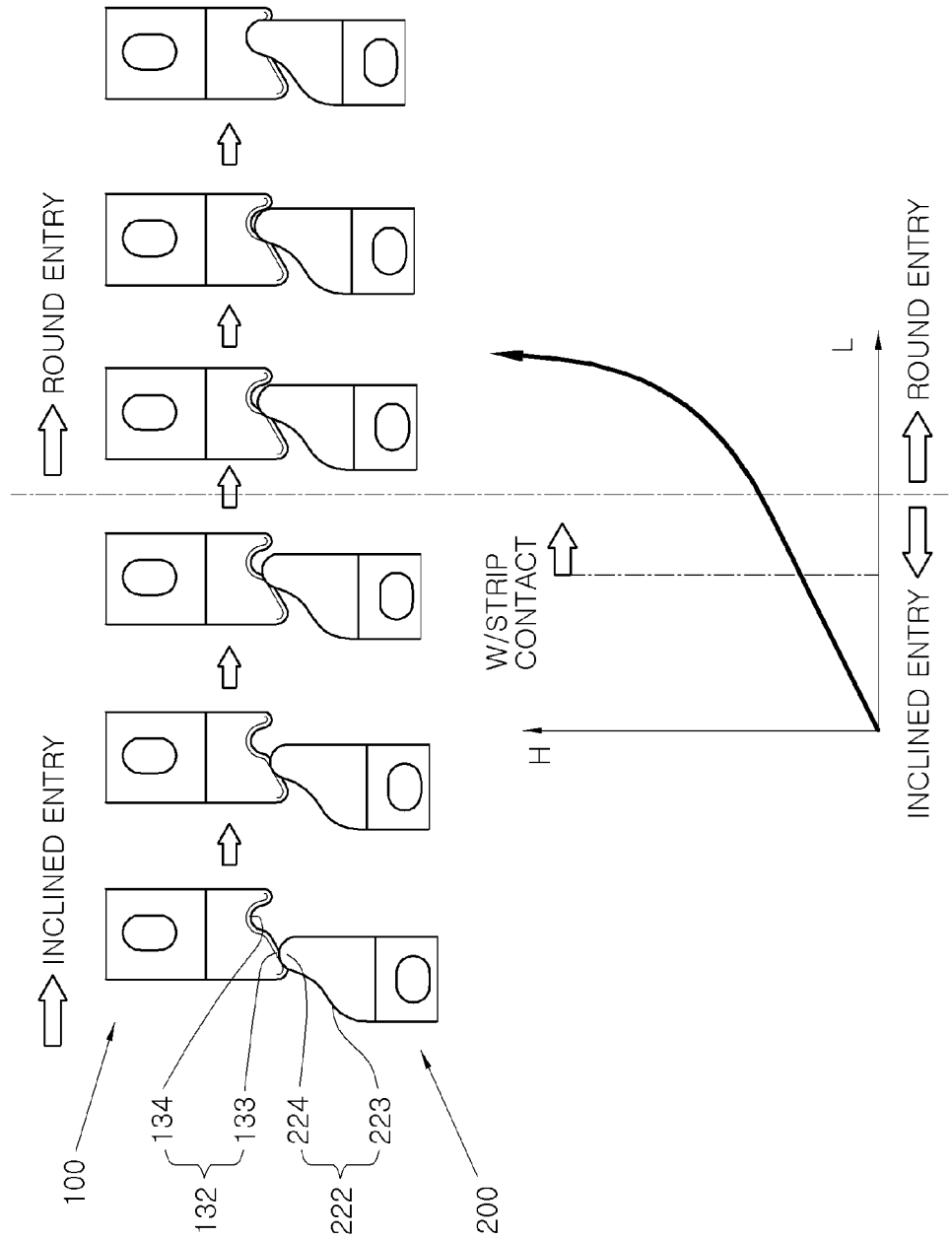

RUN-UP TYPE SWING-OUT DOOR RETAINER STRUCTURE

CROSS-REFERENCE TO RELATED APPLICATION

This application claims priority to Korean Patent Application No. 10-2019-0009316, filed on Jan. 24, 2019, which is incorporated herein by reference in its entirety.

BACKGROUND

Field of the Disclosure

The present disclosure relates to a run-up type swing-out door retainer structure, and more particularly, to a run-up type swing-out door retainer structure capable of minimizing the frictional force between retainers when a door is lifted.

Description of Related Art

Generally, vehicle doors are opened and closed toward both sides of a vehicle body for the entering and exiting the vehicle. However, doors of a vehicle such as a bus are provided with a front door at the front side of the vehicle body, or together with the front door, and a middle door at the middle portion thereof. In particular, the front door of the bus has an installation structure in which the opening and closing are performed in a swing method with respect to the vehicle body, also has a functional structure capable of absorbing the impacts together with maintaining the airtightness with respect to the vehicle body when it is closed, and uses a pneumatic-type door cylinder to allow the opening and closing to be operated automatically.

In addition, the run-up type front door of the bus is opened in a swing-out form when the door is opened, then is rotated when the door is closed, and then lifts, such that a body side retainer and a door side retainer of the vehicle body are engaged with each other to maintain the fixed state of the door. In particular, the operating method in which the door lifts after the rotation when the door is closed is defined as a run-up type.

A structure of the run-up type front door is simple and advantageous for rigidity, while it also has disadvantages such as interference noise that occurs when the vehicle is traveling and the contact noise when the door lifts. The occurrence of the interference noise when the vehicle is being operated is due to the door being in surface contact therewith after a vertical lift immediately when the door lifts, but the reaction force of the weather strip applied to the ceiling thereof is formed, thereby forming the slip friction movement trajectory along the inclined surface thereof.

The occurrence of the contact noise when the door lifts is caused by the difficulty in forming the surface contact in the actual vehicle condition and to also confirm whether the surface contact is present since it is interposed between the door and the body weather strip, and particularly, since the frictional force is excessive, only one portion may make contact therewith when the retainer is not aligned.

The contents described in this section are to help the understanding of the background of the present disclosure, and may include what is not previously known to those skilled in the art to which the present disclosure pertains.

SUMMARY

In order to overcome the problems of the related art, an exemplary embodiment of the present disclosure provides a run-up type swing-out door retainer structure capable of maintaining rigidity while preventing the occurrence of the frictional force between the retainers.

According to one aspect of the present disclosure, a run-up type swing-out door retainer structure, in a door retainer for a vehicle, may include a body retainer mounted at a body of a vehicle and a door retainer mounted at a door of the vehicle to be in close contact with the body retainer, and a depression formed at the end portion of the body retainer and a protrusion formed at the end portion of the door retainer may be divided into an inclined section and a round section to be in close contact with each other.

The body retainer may include a body retainer main body and a body retainer upper portion and a body retainer lower portion formed at both ends of the body retainer main body, respectively. A body retainer mounting aperture may be formed in the body retainer main body. The body retainer mounting aperture may have a shape of a vertical elongated aperture in which the position is vertically adjustable. The body retainer upper portion and the body retainer lower portion may be formed at the body of the vehicle by being protruded from the body retainer with respect to the longitudinal direction thereof, respectively. The body retainer upper portion and the body retainer lower portion may be mutual symmetrical shapes.

Additionally, the end portions of the body retainer upper portion and the body retainer lower portion may be formed with a depression of a shape that is concave inwardly with respect to the longitudinal direction thereof, respectively. The depression may include a depression inclined portion and a depression round portion formed inwardly from the depression inclined portion. The door retainer may include a door retainer main body, and a door retainer upper portion and a door retainer lower portion formed at both ends of the door retainer main body, respectively.

A door retainer mounting aperture may be formed in the door retainer main body. The door retainer mounting aperture may have a shape of a horizontal elongated aperture in which the position is horizontally adjustable. The door retainer upper portion and the door retainer lower portion may be formed at the door by being protruded from the door retainer with respect to the longitudinal direction thereof, respectively. The door retainer upper portion and the door retainer lower portion may be mutual symmetrical shapes.

The end portions of the door retainer upper portion and the door retainer lower portion may be formed with a protrusion of a shape that is concave outwardly with respect to the longitudinal direction thereof, respectively. The protrusion may include a protrusion inclined portion and a protrusion round portion formed outwardly from the protrusion inclined portion. The depression round portion and the protrusion round portion may be of corresponding sizes. In the depression inclined portion, a trajectory slope may be constant up to the inflection portion of the door retainer. In the depression round portion, the trajectory slope of the door retainer may increase with respect to the inflection point. The inclined angle of the protrusion inclined portion may be greater than the inclined angle of the depression inclined portion with respect to the horizontality.

According to an exemplary embodiment of the present disclosure, the run-up type swing-out door retainer structure may minimize the frictional force between the retainers, thereby preventing the occurrence of noise, being advantageous for securing rigidity, and improving the assembly process in a symmetrical shape.

BRIEF DESCRIPTION OF THE DRAWINGS

The above and other features of the present disclosure will now be described in detail with reference to certain exemplary embodiments thereof illustrated the accompanying drawings which are given herein below by way of illustration only, and thus are not limitative of the present disclosure, and wherein:

FIG. 6 is a schematic diagram sequentially illustrating the coupled relationship between the body retainer and the door retainer of the run-up type swing-out door retainer structure according to an exemplary embodiment of the present disclosure and a graph illustrating the moving trajectory corresponding thereto.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The exemplary embodiments described below are provided so that those skilled in the art may easily understand the technical spirit of the present disclosure, and the present disclosure is not limited thereto. In addition, those illustrated in the accompanying drawings are the drawings illustrated for explaining the exemplary embodiments of the present disclosure and can be different from forms actually implemented. It should be understood that when any component is referred to as being connected or coupled to another element, it can be directly connected or coupled to another element, but other components may also be present therebetween.

Figure 1:
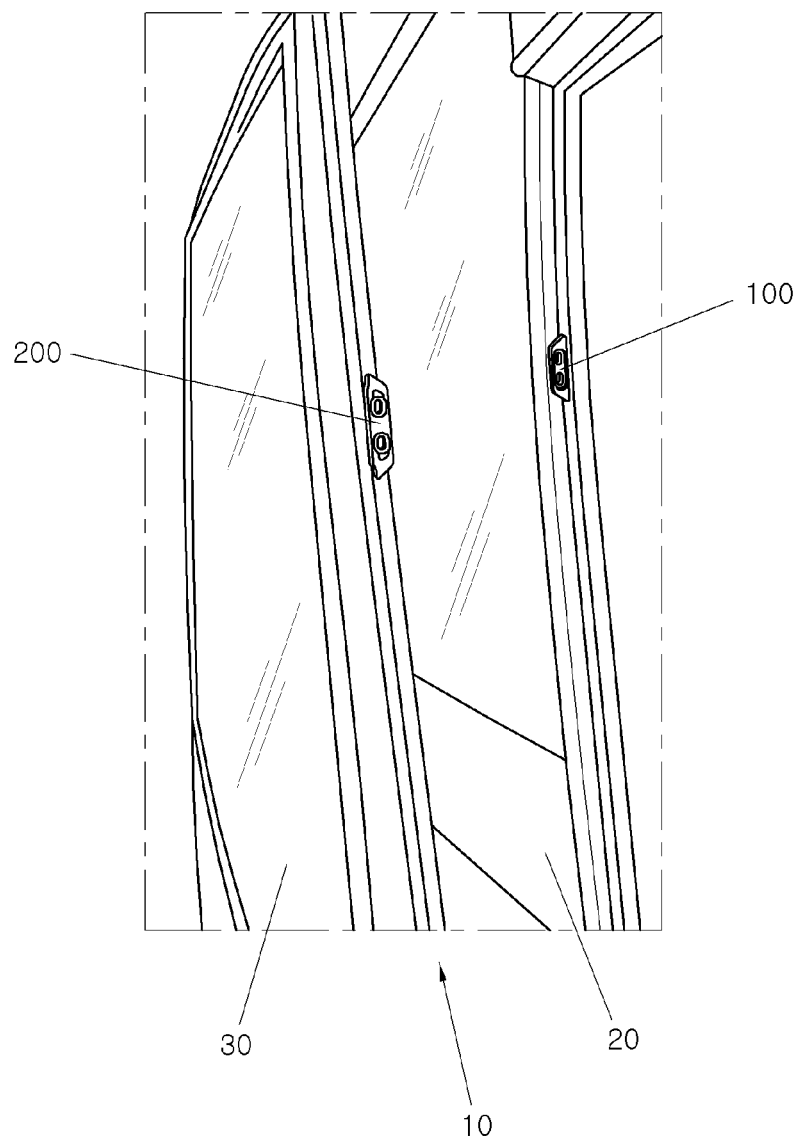
FIG. 1 is an example of mounting a run-up type swing-out door retainer structure according to an exemplary embodiment of the present disclosure.
Figure 2:
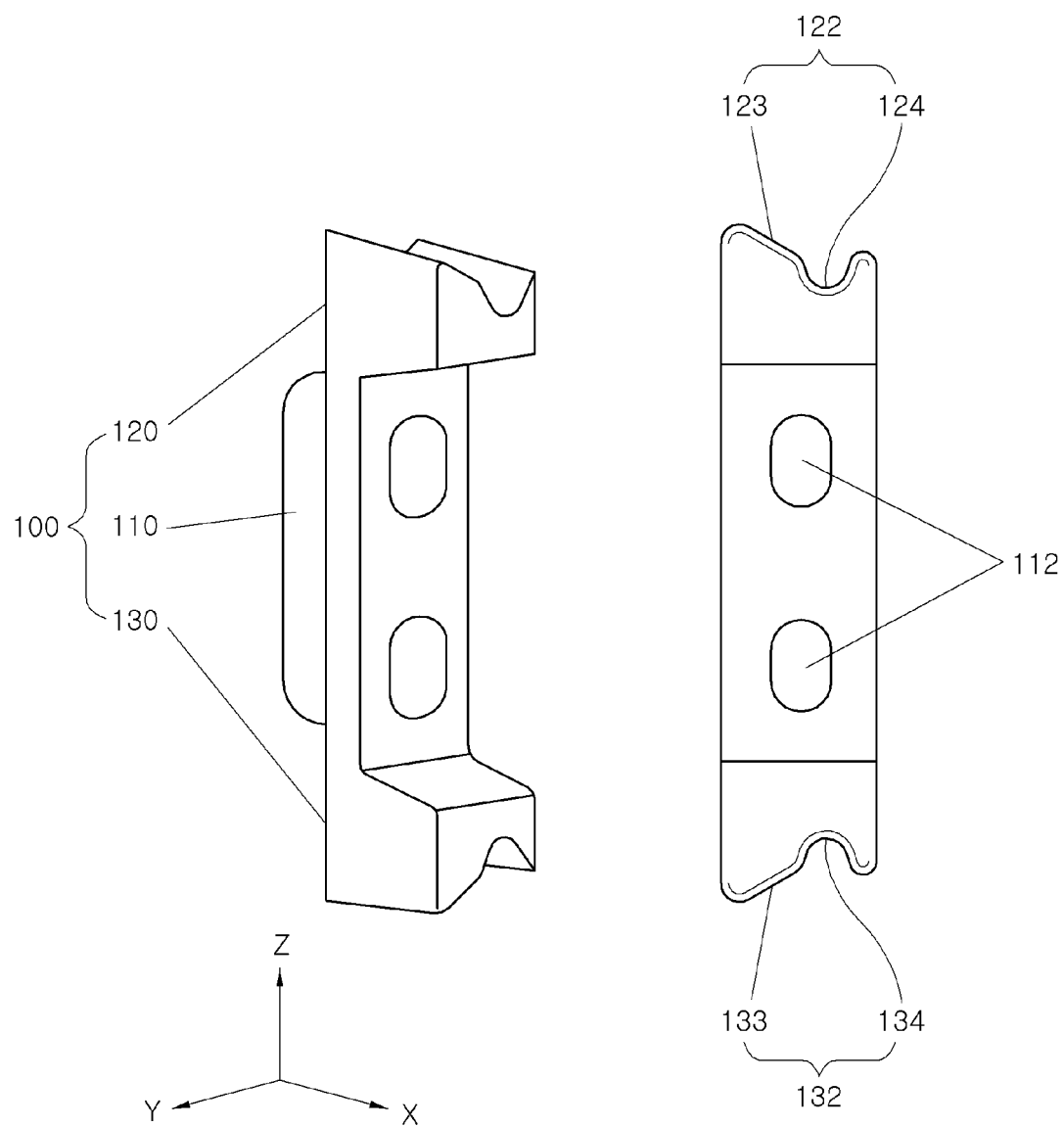
FIG. 2 is a perspective diagram and a front diagram of a body retainer of the run-up type swing-out door retainer structure according to an exemplary embodiment of the present disclosure.
Figure 3:
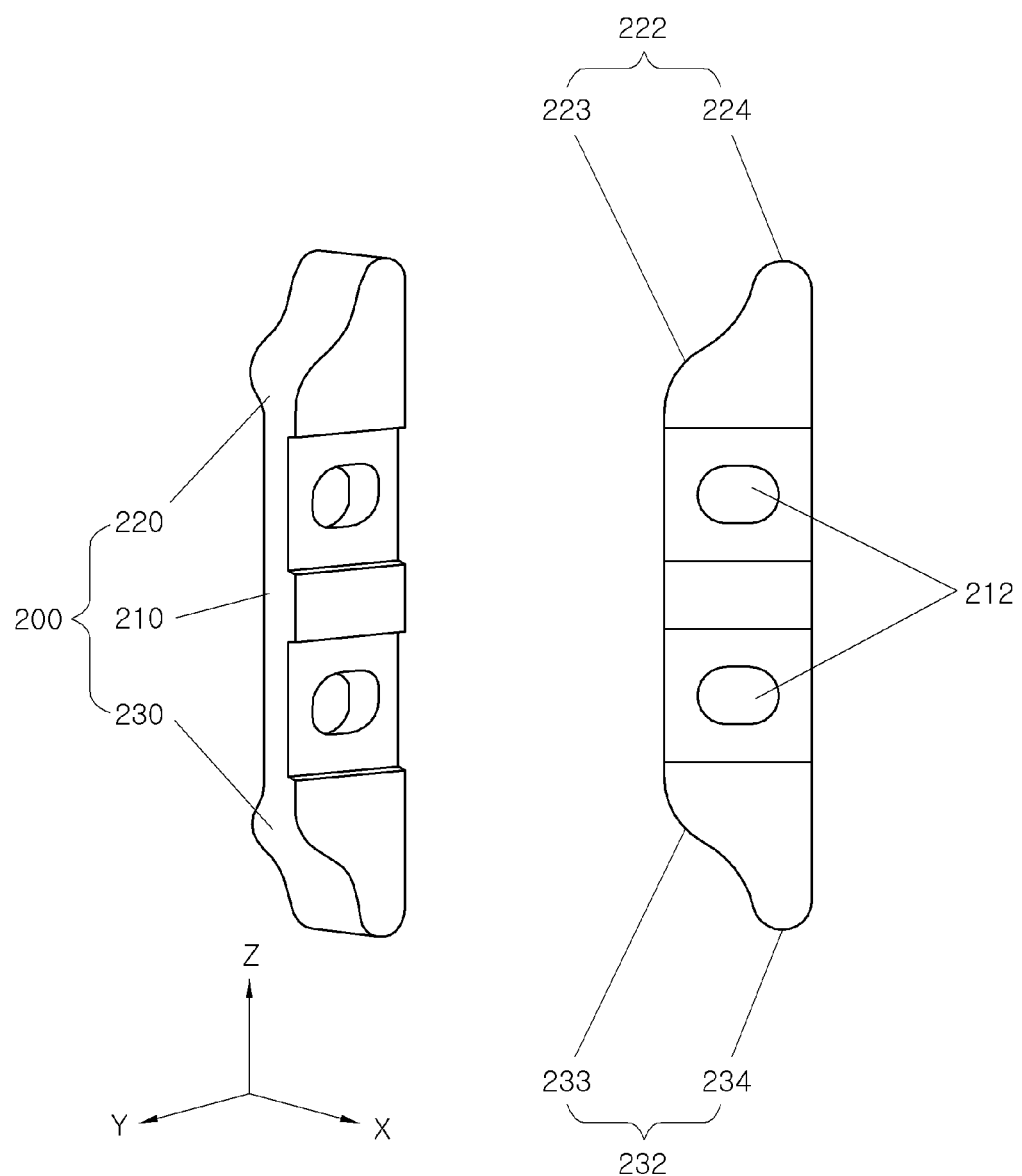
FIG. 3 is a perspective diagram and a front diagram of a door retainer of the run-up type swing-out door retainer structure according to an exemplary embodiment of the present disclosure.

FIG. 1 is an example of mounting a run-up type swing-out door retainer structure according to an exemplary embodiment of the present disclosure, FIG. 2 is a perspective diagram and a front diagram of a body retainer of the run-up type swing-out door retainer structure according to an exemplary embodiment of the present disclosure, and FIG. 3 is a perspective diagram and a front diagram of a door retainer of the run-up type swing-out door retainer structure according to an exemplary embodiment of the present disclosure.

Referring to FIGS. 1 to 3 together, a run-up type swing-out door retainer structure according to an exemplary embodiment of the present disclosure may include a body retainer 100 mounted at a body 20 of a vehicle 10, and a door retainer 200 attached to a door 30 of the vehicle 10 to be in close contact (e.g., abutting contact) with the body retainer 100.

In particular, a depression 132 formed at the end portion of the body retainer 100 and a protrusion 222 formed at the end portion of the door retainer 200 may be formed with a inclined section and a round section, respectively, thereby forming the coupled structure by the mutual matching. The inclined section may be characterized by depression inclined portions 123, 133, and the round section may be characterized by depression round portions 124, 134. In one specific example, the body retainer 100 may include a body retainer main body 110, a body retainer upper portion 120, and a body retainer lower portion 130 wherein the body retainer upper and lower portions may be formed at both ends of the body retainer main body 110, respectively.

According to the present disclosure, a body retainer mounting aperture 112 may be formed in the body retainer main body 110. The body retainer mounting aperture 112 may have a shape of a vertically elongated aperture in which the position is vertically adjustable. Although it is illustrated in the drawing that two body retainer mounting apertures 112 are formed therein, one body retainer mounting aperture 112 may also be formed to have a horizontal elongated aperture that is elongated horizontally, if necessary.

Explaining such a structure as the XYZ coordinate system, the body retainer upper portion 120 and the body retainer lower portion 130 may be formed at the body 20 of the vehicle 10 by being protruded from the body retainer 100 in the X-axis direction with respect to the longitudinal direction thereof, respectively. In particular, the body retainer upper portion 120 and the body retainer lower portion 130 may be mutually symmetrical shapes with respect to the center thereof. Accordingly, the manufacturing process performance may be improved by maintaining the fixed position when the body retainer 100 is coupled in the X-axis direction.

In addition, the end portions of the body retainer upper portion 120 and the body retainer lower portion 130 may be formed with depressions 122, 132 of a shape that is concave inwardly with respect to the longitudinal direction thereof, respectively. Herein, the depressions 122, 132 may include depression inclined portions 123, 133 and depression round portions 124, 134 formed by extending inwardly from the depression inclined portions 123, 133, respectively. In addition, in one specific example, the door retainer 200 may include a door retainer main body 210, a door retainer upper portion 220, and a door retainer lower portion 230, wherein the door retainer upper and lower portions may be formed at both ends of the door retainer main body 210, respectively.

According to the present disclosure, a door retainer mounting aperture 212 may be formed in the door retainer main body 210. In particular, the door retainer mounting aperture 212 may have a shape of a horizontally elongated aperture in which the position is horizontally adjustable. Although it is illustrated in the drawing that two door retainer mounting apertures 212 are formed therein, one door retainer mounting aperture 212 of the door retainer mounting apertures 212 may also be a shape of a vertically elongated aperture that is elongated vertically.

Explaining such a structure as the XYZ coordinate system, the door retainer upper portion 220 and the door retainer lower portion 230 may be formed at the door 30 by being protruded from the door retainer 200 in the X-axis direction with respect to the longitudinal direction thereof, respectively. In particular, the door retainer upper portion 220 and the door retainer lower portion 230 may be mutually symmetrical shapes with respect to the center thereof. Accordingly, the fixed position may be maintained when the body retainer 100 is coupled to the body 20 of the vehicle 10 in the X-axis direction and the manufacturing process performance as in the body retainer may be improved 100.

Additionally, protrusions 222, 232 of a shape that is convex outwardly with respect to the longitudinal direction thereof may be formed at the end portions of the door retainer upper portion 220 and the door retainer lower portion 230, respectively. Herein, the protrusions 222, 232 may include protrusion inclined portions 223, 233 and protrusion round portions 224, 234 formed outwardly from the protrusion inclined portions 223, 233. In such a structure, the depression round portions 124, 134 and the protrusion round portions 224, 234 may be of corresponding sizes. In particular, the inclined angle ($\theta 1$) of the protrusion inclined portions 223, 233 may be greater than the inclined angle ($\theta 2$) of the depression inclined portions 123, 133 with respect to the horizontality, as illustrated in FIG. 5.

Figure 4:
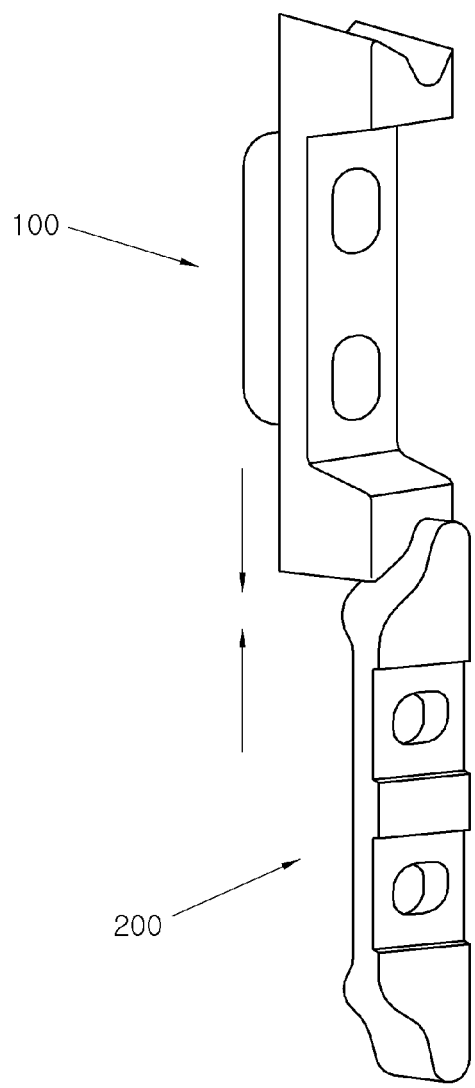
FIG. 4 is a diagram illustrating the coupling between the body retainer and the door retainer of the run-up type swing-out door retainer structure according to an exemplary embodiment of the present disclosure.
Figure 5:
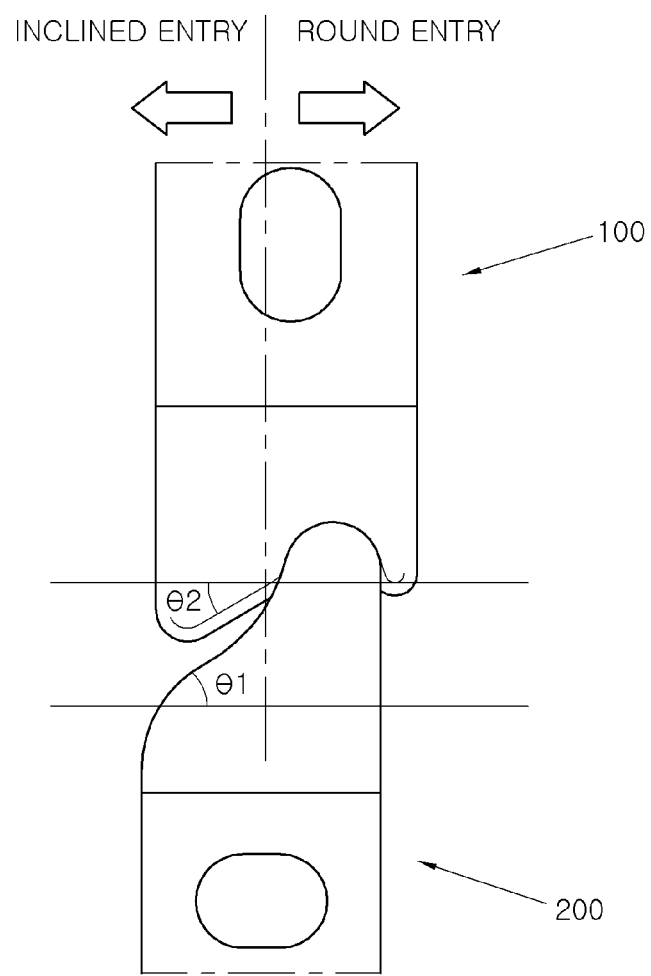
FIG. 5 is a partially enlarged schematic diagram of the body retainer and the door retainer of the run-up type swing-out door retainer structure according to an exemplary embodiment of the present disclosure.

FIG. 4 is a diagram illustrating the coupling between the body retainer and the door retainer of the run-up type swing-out door retainer structure according to an exemplary embodiment of the present disclosure, FIG. 5 is a partially enlarged schematic diagram of the body retainer and the door retainer of the run-up type swing-out door retainer structure according to an exemplary embodiment of the present disclosure, and FIG. 6 is a schematic diagram sequentially illustrating the coupled relationship between the body retainer and the door retainer of the run-up type swing-out door retainer structure according to an exemplary embodiment of the present disclosure and a graph illustrating the moving trajectory corresponding thereto.

Referring to FIGS. 4 to 6 together with FIGS. 1 to 3, describing the operating relationship between the body retainer and the door retainer of the run-up type swing-out door retainer structure according to an exemplary embodiment of the present disclosure, the run-up type swing-out door retainer structure may include the body retainer 100 mounted at the body 20 of the vehicle 10 and the door retainer 200 mounted at the door 30 of the vehicle 10 to be in close contact with (e.g., abutting contact) the body retainer 100. In particular, the door retainer 200 may abut the body retainer 100 when the door 30 rotates and lifts in the X-axis direction.

The movement may be distinguished from an inclined entry section and a round entry section. For this purpose, referring to a sequential procedure of the movement together with a graph of FIG. 6, when the protrusion round portion 224 contacts the depression inclined portion 133, the lifting height linearly increases according to the horizontal moving distance. In addition, FIG. 6 shows that when the protrusion round portion 224 contacts the depression round portion 134, it lifts with a downward convex curve according to the horizontal moving distance.

In other words, when the door 30 rotates and lifts, the protrusion round portion 224 of the door retainer 200 contacts the depression inclined portion 133 of the body retainer 100. In the depression inclined portion 133, the trajectory slope, in which the door retainer 200 contacts the body retainer 100 to move to an inflection point A, becomes constant. Then, when the door retainer 200 reaches the inflection point A and moves on the depression round portion 124, the trajectory slope of the door retainer 200 increases with respect to the inflection point A, and the door retainer 200 may be inserted into the depression round portion 134 of the body retainer 100 to be in close contact with each other (e.g., abutting contact).

Therefore, in the run-up type swing-out door retainer structure according to the present disclosure, the distance of the inclined section is decreased, the friction influence is minimized, and the lift occurs without the influence of the friction after the inclined section enters the round section and therefore, the frictional force between the retainers may be minimized since the influence by the reaction force of the weather strip is minimal, thereby preventing the occurrence of noise, being advantageous for securing rigidity, and improving the assemble process in a symmetrical shape.

It will be understood by those skilled in the art to which the present disclosure pertains that the present disclosure may be embodied in other specific forms without changing the technical spirit or essential features thereof. Therefore, it should be understood that the above-described embodiments are only for illustrating the exemplary embodiments among various embodiments to facilitate understanding of those skilled in the art, the technical spirit of the present disclosure is not necessarily limited or restricted only by the embodiments, other exemplary embodiment equivalent thereto as well as various modifications, additions, and changes can be made within the technical spirit of the present disclosure.

What is claimed is:

1. A run-up type swing-out door retainer structure in a door retainer the run-up type swing-out door retainer structure, comprising:
   a body retainer mounted at a body of the vehicle; and
   a door retainer mounted at a door of the vehicle to abut the body retainer,
   wherein the body retainer includes a depression formed at the end portion thereof and the door retainer includes a protrusion formed at the end portion thereof and each of the depression and the protrusion includes an inclined section and a round section configured to abut each other,
   wherein the depression includes a depression inclined portion and a depression round portion formed inwardly from the depression inclined portion,
   wherein the protrusion includes a protrusion inclined portion and a protrusion round portion formed outwardly from the protrusion inclined portion, and
   wherein an inflection portion is formed between the inclined section and the round section.

2. The run-up type swing-out door retainer structure of claim 1, wherein a body retainer mounting aperture is formed in the body retainer main body.

3. The run-up type swing-out door retainer structure of claim 2, wherein the body retainer mounting aperture is a shape of a vertically elongated aperture in which the position is vertically adjustable.

4. The run-up type swing-out door retainer structure of claim 1, wherein the body retainer upper portion and the body retainer lower portion are protruded from the body retainer in a longitudinal direction thereof, respectively.

5. The run-up type swing-out door retainer structure of claim 4, wherein the body retainer upper portion and the body retainer lower portion are mutual symmetrical shapes.

6. The run-up type swing-out door retainer structure of claim 1, wherein the end portions of the body retainer upper portion and the body retainer lower portion are formed with a depression of a shape that is concave inwardly with respect to the longitudinal direction thereof, respectively.

7. The run-up type swing-out door retainer structure of claim 1, wherein the door retainer includes:
a door retainer main body; and
a door retainer upper portion and a door retainer lower portion formed at both ends of the door retainer main body, respectively.

8. The run-up type swing-out door retainer structure of claim 7, wherein a door retainer mounting aperture is formed in the door retainer main body.

9. The run-up type swing-out door retainer structure of claim 8, wherein the door retainer mounting aperture is a shape of a horizontally elongated aperture in which the position is horizontally adjustable.

10. The run-up type swing-out door retainer structure of claim 7, wherein the door retainer upper portion and the door retainer lower portion protrude from the door retainer in a longitudinal direction thereof, respectively.

11. The run-up type swing-out door retainer structure of claim 10, wherein the door retainer upper portion and the door retainer lower portion are mutual symmetrical shapes.

12. The run-up type swing-out door retainer structure of claim 7, wherein the end portions of the door retainer upper portion and the door retainer lower portion are formed with a protrusion of a shape that is concave outwardly with respect to the longitudinal direction thereof, respectively.

13. The run-up type swing-out door retainer structure of claim 1, wherein the depression round portion and the protrusion round portion have corresponding sizes.

14. The run-up type swing-out door retainer structure of claim 1, wherein the depression round portion and the protrusion round portion have corresponding sizes.

15. The run-up type swing-out door retainer structure of claim 1, wherein in the depression inclined portion, the trajectory slope thereof is constant up to the inflection portion of the door retainer.

16. The run-up type swing-out door retainer structure of claim 1, wherein in the depression round portion, the trajectory slope of the door retainer increases with respect to the inflection point.

17. The run-up type swing-out door retainer structure of claim 1, wherein the inclined angle of the protrusion inclined portion is greater than the inclined angle of the depression inclined portion with respect to the horizontality.

* * * * *